Oct. 7, 1924.  
J. R. SIEGER  
1,510,634  
ADJUSTABLE WRENCH  
Filed June 18, 1923
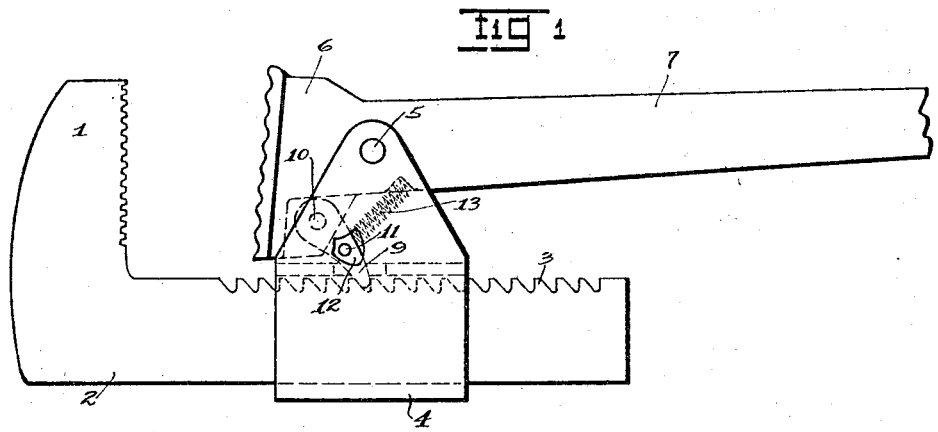
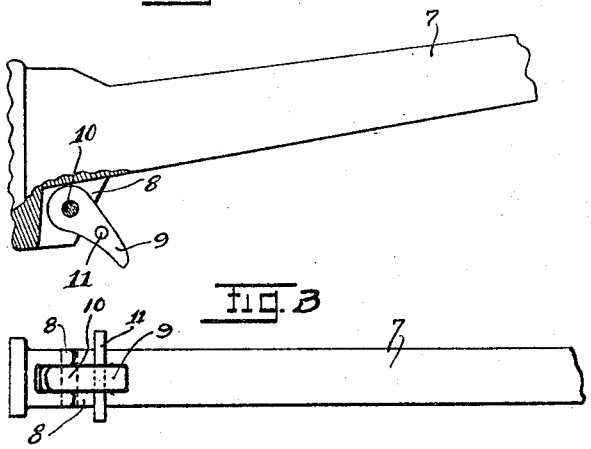
Inventor  
JOHN R SIEGER  
By C. A. Enochs  
Attorney Patented Oct. 7, 1924.

1,510,634

UNITED STATES PATENT OFFICE.

JOHN R. SIEGER, OF MINNEAPOLIS, MINNESOTA.

ADJUSTABLE WRENCH.

Application filed June 18, 1923. Serial No. 646,062.

*To all whom it may concern:*

Be it known that I, JOHN R. SIEGER, a citizen of the United States, and a resident of Minneapolis, in the county of Hennepin and State of Minnesota, have invented certain new and useful Improvements in Adjustable Wrenches, of which the following is a specification.

One object of my invention is to provide an improved form of wrench that can be quickly adjusted to fit any nut or pipe on which it is used.

Another object is to provide a locking arrangement between the fixed and loose jaws that will allow a quick take-up between the two jaws.

Another object is to provide a locking arrangement such that will allow a quick take-up between the jaws when the first pressure is applied on the pipe or nut and then a slower take-up grip as increased pressure is applied.

Another object is to provide improved means for releasing the quick take-up mechanism so the wrench may be readily set to fit any pipe or nut.

With these and incidental objects in view the invention consists of certain novel features of construction and combination of parts, the essential elements of which are hereinafter described with reference to the drawing which accompanies and forms a part of this specification.

In the drawing, Figure 1 is a side elevation of a wrench embodying my invention; Figure 2 is a similar view of the loose jaw and handle; and Figure 3 is a bottom view of the part shown in Figure 2 to clearly indicate the position of the dog in the loose jaw.

As shown in the drawing, the wrench consists of the fixed head 1 having a rack bar 2 extending at right angles thereto, said rack bar having rack teeth 3 thereon. The saddle 4 loosely encloses the rack bar 2 and is pivoted at 5 to the loose jaw 6, which has the handle 7 extending therefrom. The loose jaw is cut out at 8, as better shown in Figures 2 and 3, and the dog 9, which engages the rack teeth 3, is pivoted to the loose jaw at 10. The pin 11, which is fixed in the dog 9, extends through the aperture 12 in the saddle 4 to allow the dog to be released by the fingers. The spring 13, positioned between the dog and the loose jaw handle 7, serves to keep the dog normally in engagement with the rack teeth 3.

When the wrench is to be applied to a nut or pipe the dog 9 is released from the rack teeth so the jaws will loosely pass over the nut or pipe, then the jaws are moved towards the pipe from side to side, the dog catching the last tooth that it can engage when both jaws are in contact with the nut or pipe. When pressure is then applied by rotating the handle 7, it will be noted that inasmuch as the dog is pivoted to the loose jaw, intermediate of its engagement with the rack teeth and the point where the saddle is pivoted to the loose jaw, and the dog engages the rack teeth forward of or adjacent to the normal plane passing through the pivot point of the saddle, the saddle will creep towards the fixed jaw, this motion being comparatively rapid, thus causing a quick grip on the pipe or nut to be turned the expression forward of as used in reference to the location of the engagement point of the dog and the rack teeth, meaning toward the jaws of the wrench. After the full motion of the saddle towards the fixed jaw has occurred the locking action of the dog with the teeth is of the toggle type, so it is impossible for the dog to become disengaged, as the more firmly the pipe is gripped, the more firmly the dog holds in the teeth.

In addition there is the ordinary pivot action at the point 5 which tends to bring the fixed and loose jaws closer together across the pipe or nut as is the case with the ordinary pipe wrench, this action being independent of the gripping action of the saddle.

While I have described my invention and illustrated it in one particular design, I do not wish it to be understood that I limit myself to this construction, as it is evident the application of the invention may be varied in many ways within the scope of the following claims.

Claims:

1. In an adjustable wrench the combination with a fixed jaw having a rack bar with rack teeth thereon extending therefrom, of a saddle passing about said rack bar, a loose jaw pivoted to said saddle, a dog pivoted to said loose jaw, and cooperating with said rack teeth, at a point forward of the normal plane of the pivot between said loose jaw and said saddle, and means extending through an aperture in said saddle for releasing said dog.

2. In an adjustable wrench the combination with a fixed jaw having a rack bar with rack teeth thereon extending therefrom of a loose jaw, pivoted means holding said rack bar and said loose jaw in operative relation, and a dog pivoted to said loose jaw co-operating with said rack teeth forward of said pivoted means.

3. In an adjustable wrench the combination with a fixed jaw having a rack bar with rack teeth thereon extending therefrom of a loose jaw, means pivoted to said loose jaw and cooperating with said rack bar, to hold said jaw in close juxtaposition, and means carried by said loose jaw, intermediate of said fixed jaw and said rack bar for locking said jaws in operative position said last named means coacting with said teeth forward of said pivoted means.

4. In an adjustable wrench the combination with a fixed jaw and a rack bar with rack teeth thereon extending therefrom, of a loose jaw having a handle extending therefrom, a saddle slidably surrounding said rack bar and pivoted to said loose jaw, a spring actuated dog pivoted in said loose jaw and coacting with said rack teeth, a pin carried in said dog extending through apertures in said saddle for releasing said dog, said dog coacting with said rack teeth at a point forward of the normal plane passing through the pivot of said saddle.

JOHN R. SIEGER.